US007626371B2

(12) United States Patent
Hoshino et al.

(10) Patent No.: US 7,626,371 B2
(45) Date of Patent: Dec. 1, 2009

(54) POWER SUPPLY UNIT AND PORTABLE DEVICE

(75) Inventors: Taichi Hoshino, Kanagawa (JP); Hiroki Kikuchi, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 299 days.

(21) Appl. No.: 11/718,223

(22) PCT Filed: Sep. 28, 2005
(Under 37 CFR 1.47)

(86) PCT No.: PCT/JP2005/018400

§ 371 (c)(1),
(2), (4) Date: Aug. 31, 2007

(87) PCT Pub. No.: WO2006/048990

PCT Pub. Date: May 11, 2006

(65) Prior Publication Data

US 2009/0212752 A1 Aug. 27, 2009

(30) Foreign Application Priority Data

Nov. 4, 2004 (JP) ............................ 2004-320184

(51) Int. Cl.
*G05F 1/00* (2006.01)
*H02J 7/00* (2006.01)

(52) U.S. Cl. ........................ 323/283; 307/150; 323/901

(58) Field of Classification Search ................. 323/282, 323/283, 284, 285, 288, 901; 307/150
See application file for complete search history.

(56) References Cited

U.S. PATENT DOCUMENTS 5,994,950 A 11/1999 Ochi
6,204,646 B1 3/2001 Hiramatsu et al.
6,236,194 B1 5/2001 Manabe et al.
6,525,596 B2 2/2003 Hosono et al.

(Continued)

FOREIGN PATENT DOCUMENTS

EP 0949739 A2 10/1999

(Continued)

OTHER PUBLICATIONS

Official communication issued in the International Application No. PCT/JP2005/018400, mailed on Dec. 27, 2005.

(Continued)

*Primary Examiner*—Shawn Riley
(74) *Attorney, Agent, or Firm*—Keating & Bennett, LLP

(57) ABSTRACT

A step-like operation command signal is inputted into a time-constant circuit to generate a gradually rising operation command input voltage, which is supplied to a power supply unit. Enablement and disablement of the power supply unit is controlled on the basis of the operational command input voltage. When the operation command input voltage exceeds a first predetermined voltage level, a detection signal and a reference voltage are generated, and at the same time an error amplification circuit is enabled. On the other hand, when the operation command input voltage exceeds a second predetermined voltage level, a level shift voltage for initiating a soft start is generated, which enables execution of a soft start of the power supply unit without increasing its consumption current and reduction of the number of its terminals.

7 Claims, 4 Drawing Sheets

U.S. PATENT DOCUMENTS

| | | | | |
|---|---|---|---|---|
| 6,608,520 | B1 | 8/2003 | Miyazaki | |
| 6,661,279 | B2 | 12/2003 | Yabe | |
| 6,828,766 | B2 * | 12/2004 | Corva et al. | 323/284 |
| 6,969,977 | B1 * | 11/2005 | Smith | 323/222 |
| RE39,374 | E | 11/2006 | Manabe et al. | |
| 2001/0022527 | A1 | 9/2001 | Hosono et al. | |

FOREIGN PATENT DOCUMENTS

| | | | |
|---|---|---|---|
| JP | 62-75725 | A | 4/1987 |
| JP | 02-070264 | A | 3/1990 |
| JP | 04-040313 | U | 4/1992 |
| JP | 07-336999 | A | 12/1995 |
| JP | 09-062376 | A | 3/1997 |
| JP | 10-150152 | A | 6/1998 |
| JP | 10-232721 | A | 9/1998 |
| JP | 11-353040 | A | 12/1999 |
| JP | 2000-357018 | A | 12/2000 |
| JP | 2001-084043 | A | 3/2001 |
| JP | 2001-117650 | A | 4/2001 |
| JP | 2001-166837 | A | 6/2001 |
| JP | 2002-373942 | A | 12/2002 |
| JP | 2003-005847 | A | 1/2003 |
| JP | 2003-216247 | A | 7/2003 |
| JP | 2003-224967 | A | 8/2003 |
| WO | 2006/048990 | A1 | 5/2006 |
| WO | 2006/049109 | A1 | 5/2006 |
| WO | 2006/049110 | A1 | 5/2006 |

OTHER PUBLICATIONS

Official communication issued in the International Application No. PCT/JP2005/019950, mailed on Jan. 24, 2006.

Official communication issued in the International Application No. PCT/JP2005/019954, mailed on Jan. 24, 2006.

Taichi Hoshino et al.; "Power Supply Unit and Portable Device"; U.S. Appl. No. 11/718,219, filed Apr. 27, 2007.

Taichi Hoshino et al.; "Power Supply Unit and Portable Device"; U.S. Appl. No. 11/718,220, filed Apr. 27, 2007.

* cited by examiner

POWER SUPPLY UNIT AND PORTABLE DEVICE

BACKGROUND OF THE INVENTION

1. Field of the Invention

This invention relates to an electric power supply unit for providing a predetermined output voltage through conversion of a power supply voltage of a dc power supply such as a battery, and to a portable device equipped with such power supply unit.

2. Description of the Related Art

A power supply unit such as a series regulator typically converts the power supply voltage of a dc power supply to a predetermined output voltage. It is necessary for such power supply unit to suppress inrush current that would otherwise flow into a load and a smoothing capacitor connected to the power supply unit.

A conventional power supply unit can be provided with a capacitor connected in series with a constant current source and a power switch connected in parallel with the capacitor such that when the power switch is turned off (or opened) the constant current can gradually charge the capacitor, thereby causing the power supply unit to undergo a slow start, as disclosed in Japanese Patent Application Laid Open H7-336999. In this case, the number of external terminals of the power supply unit can be reduced since the power switch can control the operation of the power supply unit.

However, this type of conventional power supply circuit requires a predetermined current from a constant current source to flow through the power switch even in the standby condition (where the power switch is turned on) to ensure that the capacitor can be charged if the power switch is turned off.

Thus, the conventional power supply unit inevitably consumes a certain amount of current in the standby condition. In order to extend the continuously operable time of a battery powered portable device, minimization of its consumption current is strongly desired. Therefore, in order to perform soft start, it is not desirable that the current increases.

SUMMARY OF THE INVENTION

It is, therefore, an object of the present invention to provide a power supply unit capable of executing soft start without increasing its consumption current and having a reduced number of terminals. It is another object of the invention to provide a portable device accommodating such power supply unit.

A power supply unit in accordance with one aspect of the invention has an output circuit for outputting a predetermined output voltage obtained by regulating a given power supply voltage; an error amplification circuit adapted to compare a feedback voltage associated with the output voltage with a reference voltage, and, based on the comparison, control the output circuit to bring the feedback voltage to the reference voltage; and a reference voltage generation circuit for generating a reference voltage, the power supply unit adapted to be controlled to assume an enabled state or a disenabled state depending on the operation command input voltage that is inputted into the operation command signal input terminal of the power supply unit and gradually rises with a predetermined time constant, the power supply unit comprising: a voltage level detector circuit for generating a detection signal when the operation command input voltage exceeds a first predetermined voltage level; and a level shift circuit for generating a level shift voltage lower than the operation command input voltage by shifting the level of the operation command input voltage, the reference voltage generation circuit further adapted to be enabled to generate the reference voltage in response to the detection signal; and the error amplification circuit adapted to be enabled in response to the detection signal to compare the level shift voltage with the feedback voltage in place of the reference voltage when the level shift voltage is lower than the reference voltage.

On the other hand, when the operation command input voltage reaches a second predetermined voltage level which is equal to or higher than the first predetermined voltage level, the level shift voltage is generated.

The level shift circuit may be provided, between a node having the operation command input voltage (the node hereinafter referred to as command receiving node) and the ground, at least one diode and at least one resistor connected in series in the order mentioned such that the level shift voltage is outputted from the series connection node of the diode and resistor.

Alternatively, the level shift circuit may be provided, between the command receiving node and the ground, a first resistor, a transistor circuit, and a second resistor, all connected in series in the order mentioned, such that the reference voltage is supplied to the transistor circuit as a control signal and that the level shift voltage is outputted from the connection node of the transistor and the second resistor.

A portable device of the invention has: an inventive power supply unit as described above; a battery power supply for supplying the power supply voltage; a control device for generating an operation command signal; and a time-constant circuit for generating the operation command input voltage in response to an operation command signal; and a load operable with the output voltage.

According to the invention, the power supply unit can control its own enablement and disablement based on an operation command input voltage inputted into the operation command signal input terminal thereof, and generates a reference voltage and a level shift voltage for executing a soft start. In this arrangement, the power supply unit can undergo a soft start without increasing its consumption current, and the unit may have a reduced number of external terminals, thereby facilitating downsizing of the IC chip that incorporates the power supply unit.

It should be noted that a detection signal is generated from the voltage level detector circuit when the operation command input voltage exceeds the first predetermined voltage level, and that, in response to the detection signal, the reference voltage is generated from the reference voltage generation circuit to enable the error amplification circuit. The level shift voltage is generated when the operation command input voltage reaches the second predetermined voltage equal to or higher than the first predetermined voltage. As a consequence, a smooth soft start of the power supply unit is executed by the level shift voltage only after the operational criteria of the error amplification circuit are satisfied.

It should be noted that an operation command signal generated by the control device in the form of, for example, a step-like voltage, rises gradually with a predetermined time constant of the time constant circuit and is supplied to the power supply unit as the operation command input signal. In this way, an operation command input signal can be formed by an additional simple time constant circuit. Thus, the structure of a portable device can be simplified accordingly.

DETAILED DESCRIPTION OF PREFERRED EMBODIMENTS

The inventive power supply unit and the portable device will now be described in detail with reference to the accompanying drawings. Incidentally, the power supply unit of the invention can be said as a semiconductor device, since it is fabricated in a transistorized LSI.

Figure 1:
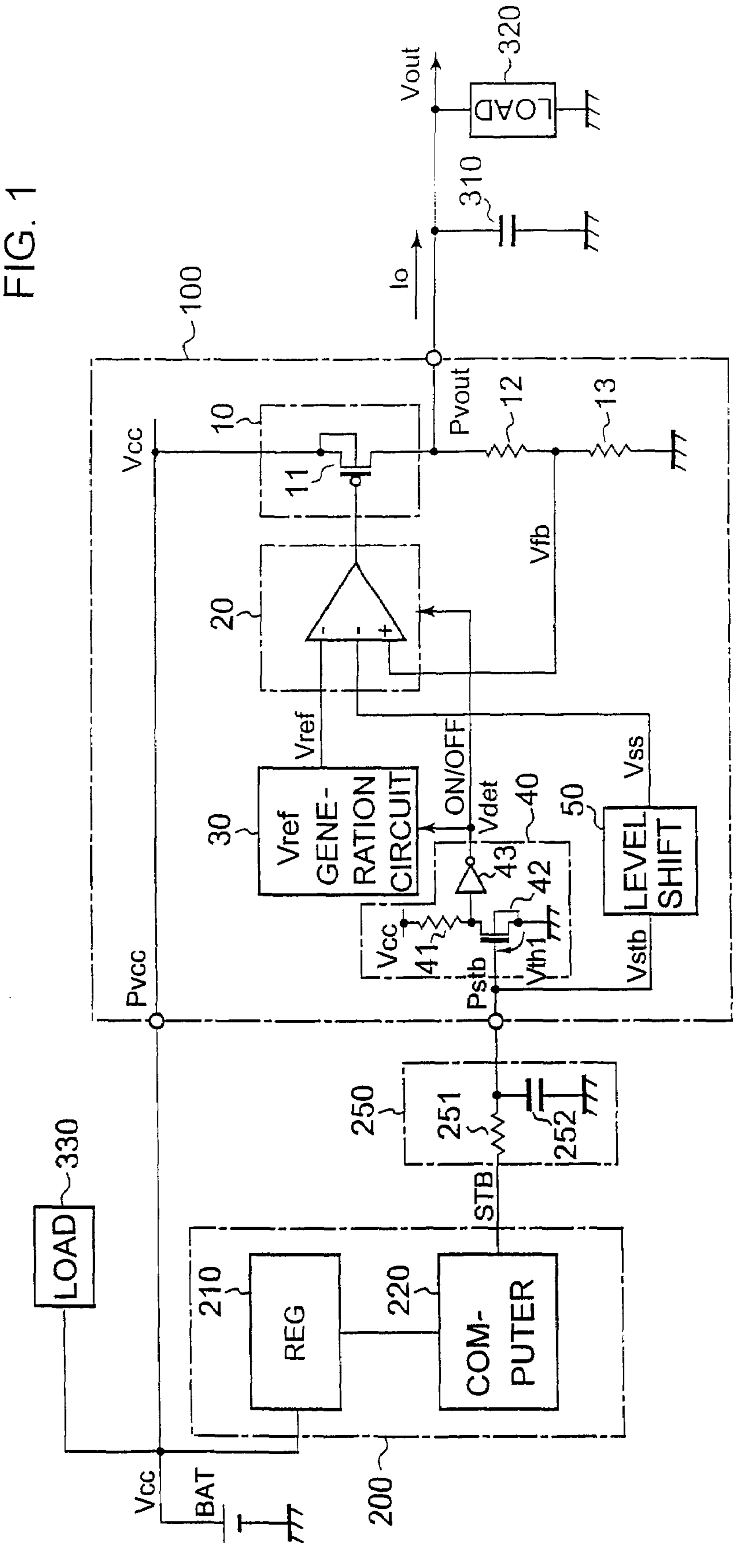
FIG. 1 is a diagram showing the arrangement of a power supply unit in accordance with one embodiment of the invention and a portable device utilizing such power supply unit.

Referring to FIG. 1, there is shown an arrangement of the power supply unit in accordance with a first embodiment of the invention, along with an arrangement of the portable device utilizing the power supply unit.

As shown in FIG. 1, a battery power supply BAT generates a power supply voltage Vcc. The level of the power supply voltage Vcc changes with the charging/discharging condition of the battery power supply BAT.

This power supply voltage Vcc is inputted into the power supply unit 100 via a power supply voltage input terminal Pvcc. The output circuit 10 is configured in the form of a series regulator that contains an output transistor 11, which provides a predetermined output voltage Vout obtained by regulating the power supply voltage Vcc in accordance with a control signal. The output transistor 11 can be a P-type MOS transistor. It is noted that the output circuit 10 is not limited to such a series regulator utilizing an output transistor 11 as shown in FIG. 1. It can be a switching type output circuit.

The output voltage Vout is supplied from the power supply unit 100 to an output smoothing capacitor 310 and a load 320 via the output terminal Pvout of the power supply unit 100. Symbol Io represents the output current outputted from the power supply unit 100. The output voltage Vout is divided by voltage dividing resistors 12 and 13 to generate a feedback voltage Vfb.

An error amplification circuit 20 has a three-input type error amplifier receiving the feedback voltage Vfb, a reference voltage Vref, and a level shift voltage Vss as described in more detail later. The reference voltage Vref has a fixed voltage. In order to allow for a soft start, the level shift voltage Vss is raised from zero volt with a given time constant to a voltage that exceeds the reference voltage Vref.

In the error amplification circuit 20, the lower one of the reference voltage Vref and the level shift voltage Vss is selected, which is then compared with the feedback voltage Vfb. Based on the comparison, the output transistor 11 is controlled so as to bring the feedback voltage Vfb to the reference voltage Vref or the level shift voltage Vss.

A reference voltage generation circuit 30 is fed the power supply voltage Vcc, for example, as its operating voltage to generate the reference voltage Vref. The reference voltage generation circuit 30 is preferably constituted of a band-gap type constant voltage circuit so that it can output as much stable reference voltage Vref as possible.

The power supply unit 100 is supplied, via an operation command signal input terminal Pstb, with an operation command input voltage Vstb that serves as a control signal for enabling or disabling the power supply unit 100.

This input voltage Vstb is obtained from a step-like operation command signal (or standby signal) STB generated by a control device 200 by smoothing it by a time constant circuit 250 so as to rise with a predetermined time constant.

The control device 200 includes a computer 220 adapted to control various components of the portable device. The control device 200 also includes a voltage regulator 210. This regulator 210 regulates the power supply voltage Vcc to the level required by the computer 220 and supplies the regulated voltage to the computer 220. The resultant power supply voltage is directly fed to a load 330.

The operation command signal STB supplied from the control device 200 has either a high (H) level or a low (L) level. The power supply unit 100 is configured to be enabled if the operation command signal STB has H level, and disabled otherwise. To do so, in the example shown herein, the error amplification circuit 20 and the reference voltage generation circuit 30 are enabled or disabled in response to the operation command signal STB. As an example, the operation command signal STB is in the range of about 1.5-3 V when it has H level, and is zero Volt (ground level) when it has L level.

This operation command signal STB is inputted into the time constant circuit 250. In the example shown herein, the time constant circuit 250 is constituted of a resistor 251 connected between the input and output ends of the circuit 250, and a capacitor 252 connected between the output end and the ground.

In response to an inputted operation command signal STB, the time constant circuit 250 outputs from the output end thereof an operation command input voltage Vstb that rises with a time constant determined by the resistance of the resistor 251 and the capacitance of the capacitor 252. This operation command input voltage Vstb is inputted into a voltage level detector circuit 40 and a level shift circuit 50 of the power supply unit 100. It should be understood that the arrangement of the time constant circuit 250 is not limited to this example, but it is rather arbitrary so long as its output voltage is allowed to rise gradually in response to the voltage inputted thereto.

The voltage level detector circuit 40 generates a detection signal Vdet when the level of the operation command input voltage Vstb exceeds a first predetermined voltage Vth1. If the detection signal Vdet is generated from this voltage level detector circuit 40, both the reference voltage generation circuit 30 and the error amplification circuit 20 will be enabled (put into ON state) from the disabled or OFF state.

The voltage level detector circuit 40 has a resistor 41 and an N-type MOS transistor 42 connected in series in the order mentioned between the power supply voltage Vcc and the ground such that the operation command input voltage Vstb is applied to the gate of the N-type MOS transistor 42. The voltage appearing at the connecting node of the resistor 41 and the N-type MOS transistor 42 is inverted by an inverter 43 before it is outputted as the detection signal Vdet. The operational threshold of the N-type MOS transistor 42 turns out to be the first predetermined voltage Vth1.

The level shift circuit 50 shifts the level of the operation command input voltage Vstb to generate a level shift voltage Vss lower than the operation command input voltage Vstb. The level shift voltage Vss is generated when the operation command input voltage Vstb has reached a second predetermined voltage Vth2 higher than, or equal to, the first predetermined voltage Vth1. That is, second predetermined voltage Vth2≧first predetermined voltage Vth1.

Figure 2:
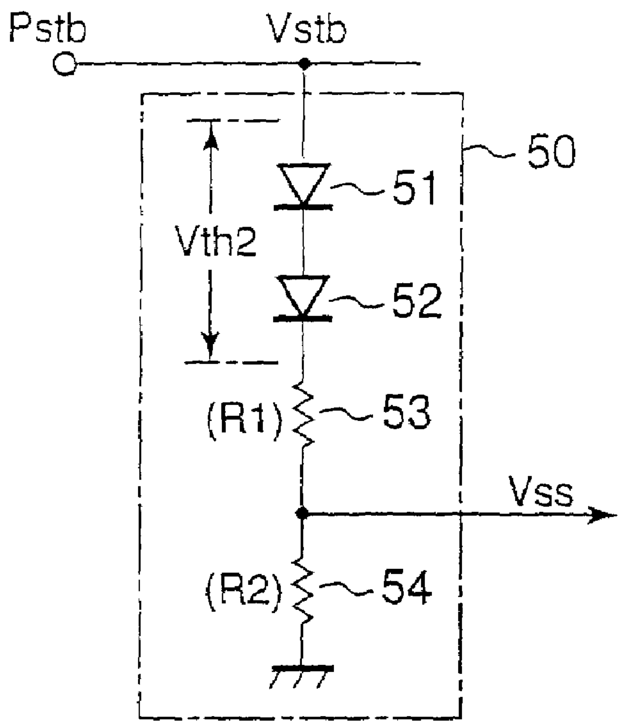
FIG. 2 is a diagram showing a first arrangement of the level shift circuit shown in FIG. 1.
Figure 3:
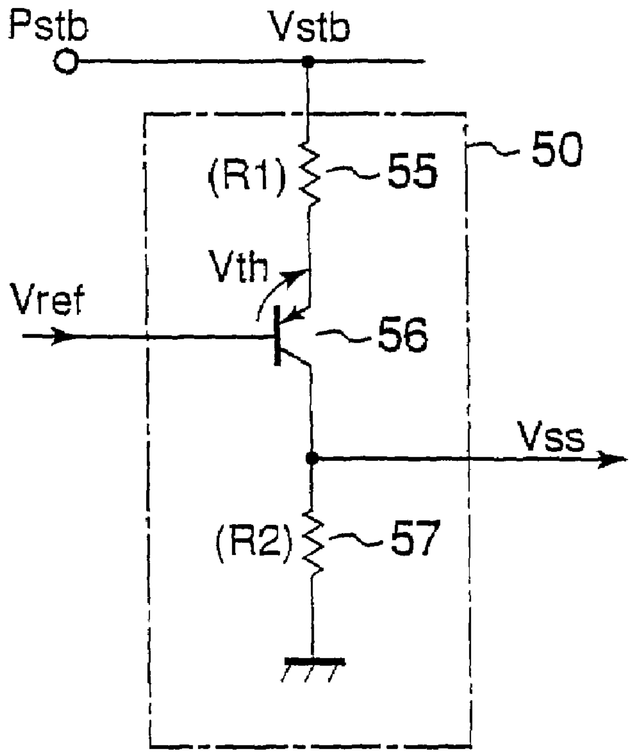
FIG. 3 is a diagram showing a second arrangement of the level shift circuit.
Figure 4:
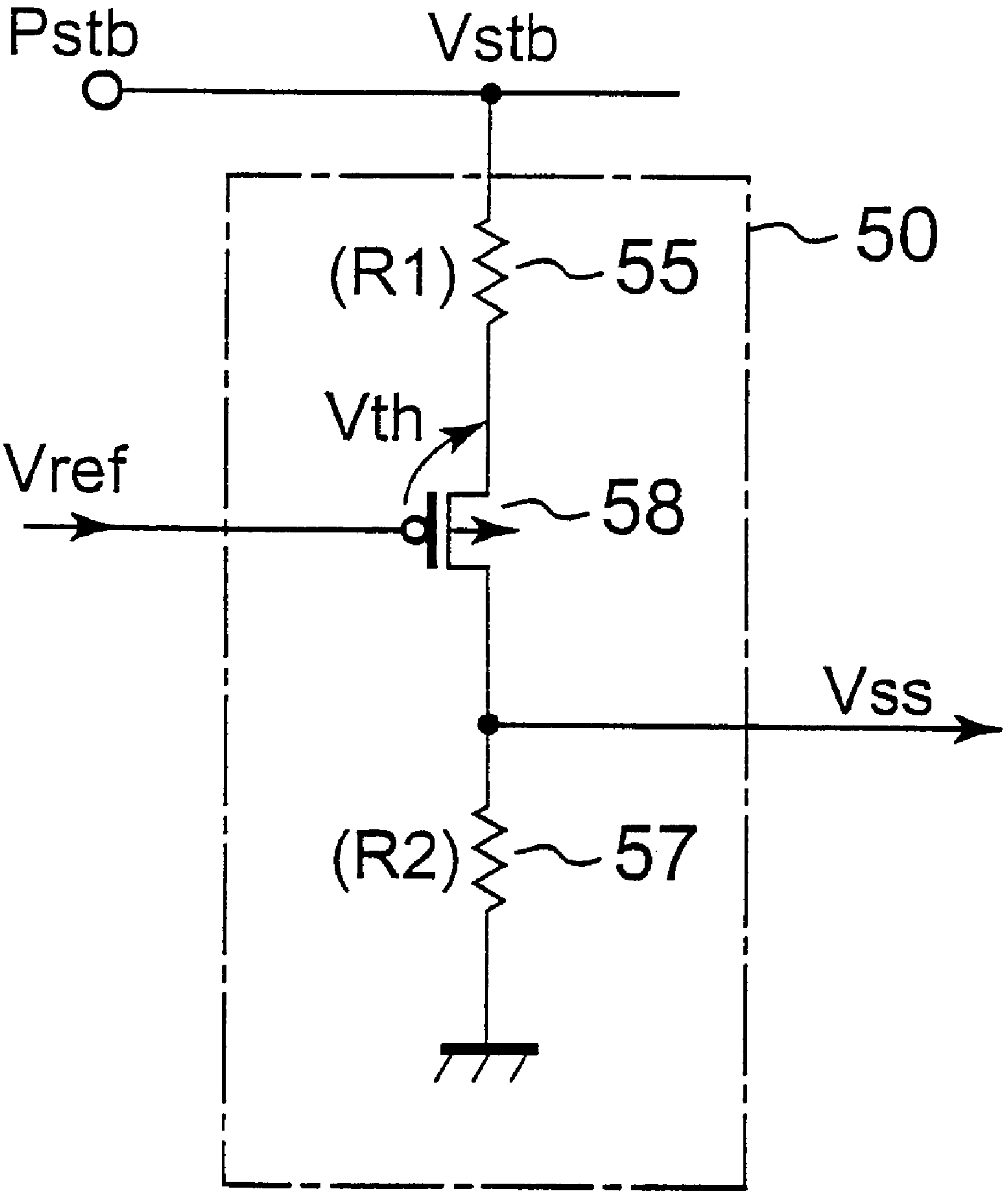
FIG. 4 is a diagram showing a third arrangement of the level shift circuit.

Referring to FIGS. 2-4, there are shown different arrangements of the level shift circuit 50.

As shown in FIG. 2, a diode 51, a diode 52, a resistor 53, and a resistor 54 are connected in series in the order mentioned between the node having the input voltage Vstb (command receiving node) and the ground. The level shift voltage Vss is outputted from the series connection node of the resistors 53 and 54.

Assuming that the second predetermined voltage level Vth2 is given by the voltage drop across the diodes 51 and 52, the level shift voltage Vss is given by $$Vss=(Vstb-Vth2)*R2/(R1+R2),$$

where R1 and R2 are the respective resistances of the resistors 53 and 54.

As seen from FIG. 2, the level shift voltage Vss is generated when the operation command input voltage Vstb exceeds the second predetermined voltage Vth2. The level of the level shift voltage Vss can be varied by regulating the resistances R1 and R2.

It is noted that the diodes 51 and 52 of FIG. 2 can be replaced by an appropriate number of diode-connected transistors creating the second predetermined voltage Vth2. The resistor 53 can be omitted.

As shown in FIG. 3, a first resistor 55, a transistor circuit 56, and a second resistor 57 are connected in series in the order mentioned between the command receiving node and the ground. In the example shown herein, the transistor circuit 56 is a PNP-type bipolar transistor. The reference voltage Vref is used as the control voltage for controlling the transistor circuit 56. The level shift voltage Vss is outputted from the connection node of the transistor circuit 56 and the second resistor 57.

Denoting by Vth the operational threshold of the transistor circuit 56, the level shift voltage Vss is given by the formula below. It is noted that the second predetermined voltage Vth2 amounts to the sum of the operational threshold Vth and the reference voltage Vref.

$$Vss=(Vstb-Vref-Vth)*R2/R1,$$

where R1 is the resistance of a resistor 55, and R2 the resistance of the resistor 57.

In the arrangement shown in FIG. 3, the level shift voltage Vss is generated when the operation command input voltage Vstb exceeds the sum of the reference voltage Vref and the threshold value Vth. The level of the level shift voltage Vss can be varied by regulating the resistances R1 and R2.

In the level shift circuit 50 shown in FIG. 4, a P-type MOS transistor 58 is used, in place of the PNP-type bipolar transistor 56 of FIG. 3. The rest of the arrangement of the level shift circuit 50 of FIG. 4 is the same as that of FIG. 3, and the both circuits perform the same level shift operation.

Operations of the above-described power supply unit 100 and the portable device will now be described with reference to the timing diagram of FIG. 5.

Figure 5:
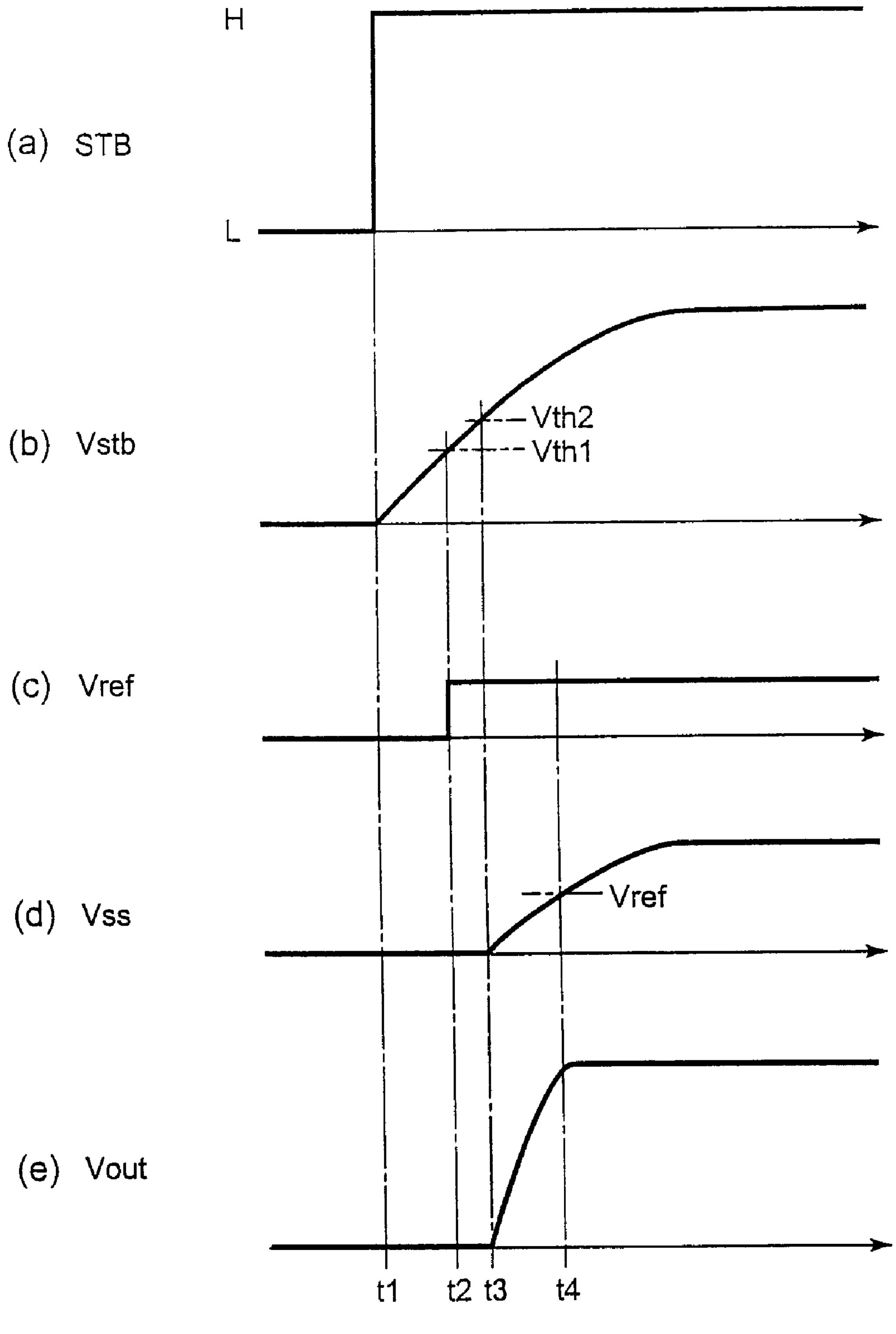
FIG. 5 is a timing diagram useful in understanding the operation of the power supply unit.

It is seen in FIG. 5 that up to time t1 the operation command signal STB issued from the control device 200 has L level and the power supply unit 100 is in the disabled state.

If, at time t1, the operation command signal STB issued from the control device 200 is pulled up to H level (e.g. 3 V), then the output voltage of the time constant circuit 250, i.e. the operation command input voltage Vstb, gradually rises in accord with the time constant of the time constant circuit 250.

At time t2 when the level of the operation command input voltage Vstb reaches the first predetermined voltage Vth1 (e.g. 0.7 V), a detection signal Vdet is outputted from the voltage level detector circuit 40.

As the detection signal Vdet is outputted, an ON signal is supplied to the error amplification circuit 20 and the reference voltage generation circuit 30, thereby enabling the power supply unit 100. Thus, a reference voltage Vref having a fixed voltage (e.g. 0.4 V) is supplied from the reference voltage generation circuit 30 to the error amplification circuit 20. At this moment t2, however, the level shift voltage Vss is zero Volt that the output voltage Vout is not generated yet.

At time t3 when the operation command input voltage Vstb reaches the second predetermined voltage Vth2, the level shift voltage Vss of the reference voltage generation circuit 30 gradually rises from zero Volt.

Meanwhile, the lower one of the reference voltage Vref and the level shift voltage Vss is selected in the error amplification circuit 20, so that the output voltage Vout is controlled to bring the feedback voltage Vfb to that lower voltage (which is initially the level shift voltage Vss). As a consequence, the output voltage Vout gradually rises, following the gradually rising level shift voltage Vss. That is, soft start of the power supply circuit 100 is realized.

At time t4 when the level shift voltage Vss exceeds the reference voltage Vref, the error amplification circuit 20 selects the reference voltage Vref. As a consequence, thereafter, the feedback voltage Vfb is controlled to remain at the reference voltage Vref to maintain the output voltage Vout at a predetermined voltage (e.g. 3 V).

As described above, according to the invention, the power supply unit 100 is controlled to be either in ON state or OFF state on the basis of the operation command input voltage Vstb inputted thereinto via the operation command signal input terminal Pstb. At the same time, the reference voltage Vref and the level shift voltage Vss for initiating a soft start are generated. Thus, a soft start is realized without increasing the consumption current of the power supply unit 100. It is noted then that the number of terminals of the power supply unit 100 to be embedded in an IC chip is reduced.

When the operation command input voltage Vstb exceeds the first predetermined voltage level Vth1, a detection signal Vdet is generated. In response to the detection signal Vdet, the reference voltage Vref is generated to enable the error amplification circuit 20. When the operation command input voltage Vstb reaches the second predetermined voltage level Vth2, the level shift voltage Vss is generated. Thus, a smooth soft start of the power supply unit 100 is initiated by the level shift voltage Vss after the operational criteria for the error amplification circuit 20 are met.

The operation command signal STB in the form of a step-like signal for example is generated from the control device 200, which rises gradually in accord with the time constant of the circuit 250 as it is supplied to the power supply unit 100 as the operation command input voltage Vstb. In this way, a desired operation command input voltage Vstb can be formed by an additional simple time constant circuit 250. which also facilitates simplification of a portable device.

An inventive power supply unit can control its own enablement and disablement based on an operation command input voltage inputted into the operation command signal input terminal thereof, and generates a reference voltage and a level shift voltage for executing a soft start. Thus, the power supply unit can perform a soft start without increasing its consumption current, with a reduced number of terminals. Accordingly, the power supply unit can be fabricated in a compact form in an IC chip, which facilitates minimization of the size and consumption current of the portable device utilizing the power supply unit.

The invention claimed is:

1. A power supply unit having:

an output circuit for outputting a predetermined output voltage obtained by regulating a given power supply voltage;

an error amplification circuit adapted to compare a feedback voltage associated with said output voltage with a reference voltage, and, based on the comparison, control said output circuit to bring said feedback voltage to said reference voltage; and a reference voltage generation circuit for generating a reference voltage, said power supply unit adapted to be controlled to assume an enabled state or a disenabled state depending on the operation command input voltage that is inputted into the operation command signal input terminal of said power supply unit and gradually rises with a predetermined time constant, said power supply unit comprising:

a voltage level detector circuit for generating a detection signal when said operation command input voltage exceeds a first predetermined voltage level; and a level shift circuit for generating a level shift voltage lower than said operation command input voltage by shifting the level of said operation command input voltage, said reference voltage generation circuit further adapted to be enabled to generate said reference voltage in response to said detection signal; and said error amplification circuit adapted to be enabled in response to said detection signal to compare said level shift voltage with said feedback voltage in place of said reference voltage when said level shift voltage is lower than said reference voltage.

2. The power supply unit according to claim 1, wherein said level shift circuit is provided, between a node (command receiving node) having said operation command input voltage and the ground, at least one diode and at least one resistor connected in series in the order mentioned such that said level shift voltage is outputted from the series connection node of said diode and resistor.

3. The power supply unit according to claim 1, wherein said level shift circuit is provided, between said command receiving node and the ground, a first resistor, a transistor circuit, and a second resistor, all connected in series in the order mentioned, such that said reference voltage is supplied to said transistor circuit as a control signal and that said level shift voltage is outputted from the connection node of said transistor circuit and said second resistor.

4. The power supply unit according to claim 1, wherein said level shift voltage is generated when said operation command input voltage reaches a second predetermined level which is equal to or higher than said first predetermined level.

5. The power supply unit according to claim 4, wherein said level shift circuit is provided, between said command receiving node and the ground, at least one diode and at least one resistor connected in series in the order mentioned such that said level shift voltage is outputted from the series connection node of said diode and resistor.

6. The power supply unit according to claim 4, wherein said level shift circuit is provided, between said command receiving node and the ground, a first resistor, a transistor circuit, and a second resistor, all connected in series in the order mentioned, such that said reference voltage is supplied to said transistor circuit as a control signal and that said level shift voltage is outputted from the connection node of said transistor circuit and said second resistor.

7. A portable device, comprising a power supply unit according to claim 1;

a battery power supply for generating said power supply voltage;

a control device for generating an operation command signal;

a time-constant circuit for outputting said operation command input voltage in response to said operation command signal inputted; and a load receiving said output voltage.

* * * * *